Patented Dec. 13, 1938

2,139,687

UNITED STATES PATENT OFFICE 2,139,687

CINNAMAMIDS

William A. Lott, East Orange, N. J., assignor to E. R. Squibb & Sons, New York, N. Y., a corporation of New York No Drawing. Original application September 12, 1933, Serial No. 689,158, now Patent No. 2,103,265. Divided and this application May 8, 1937, Serial No. 141,568

4 Claims. (Cl. 260—558)

This application is a division of application Serial No. 689,158, filed September 12, 1933, Patent No. 2,103,265.

This invention relates to, and has for its object the provision of, certain cinnamamids.

The compounds of this invention are those having the structural formula

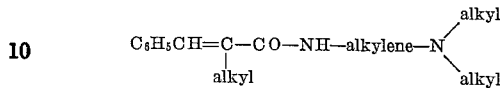

and the salts thereof. These compounds, which are characterized by valuable local-anesthetic properties, may be prepared by causing the appropriate cinnamyl chloride to react with the appropriate diamine.

Examples

1. N-α-ethyl-cinnamyl N'-diethyl ethylene diamine hydrochloride. A solution of 11.5 g. of α-ethyl cinnamyl chloride in 25 cc. of benzene is gradually added to a solution of 6.9 g. of unsymmetrical diethyl ethylene diamine in 50 cc. of dry benzene, and the reaction mixture is cooled to room temperature; and the copious yellow precipitate is washed several times with dry benzene and once with dry acetone. There remains the compound sought, in the form of snow-white crystals having a melting point of 162.5–163.5° C. and dissolving readily in water.

2. N-α-methyl-cinnamyl N-diethyl ethylene diamine hydrochloride. 8.0 g. of α-methyl cinnamyl chloride dissolved in 30 cc. of absolute ether is refluxed for three hours with a solution of 3.9 g. of diethyl ethylene diamine in 30 cc. of anhydrous ether; the crystalline product, which is the desired compound, is separated by filtration, and after recrystallization from acetone is in the form of white crystals melting at 111–112.5° C.

3. N-α-amyl-cinnamyl N'-diethyl ethylene diamine hydrochloride. A solution of 5 g. of α-amyl cinnamyl chloride in 15 cc. anhydrous ether is added to a solution of 1.8 g. of unsymmetrical diethyl ethylene diamine in 15 cc. anhydrous ether, and the mixture is refluxed for about an hour; on cooling, the compound sought separates as white crystals, which, after being washed several times with anhydrous ether, melt at 84–95° C.

It is to be understood that the foregoing examples are merely illustrative and by no means limitative of the invention, which may be variously otherwise embodied—as with respect to particular compositions and processes—within the scope of the appended claims.

I claim:

1. Compounds of the group consisting of

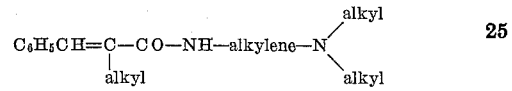

and the inorganic salts thereof.

2. N-α-ethyl-cinnamyl N'-diethyl ethylene diamine hydrochloride.

3. N-α-methyl-cinnamyl N'-diethyl ethylene diamine hydrochloride.

4. N-α-amyl-cinnamyl N'-diethyl ethylene diamine hydrochloride.

WILLIAM A. LOTT.